R. A. MORRISEY.
SAW.
APPLICATION FILED AUG. 1, 1917.
1,281,810.
Patented Oct. 15, 1918.
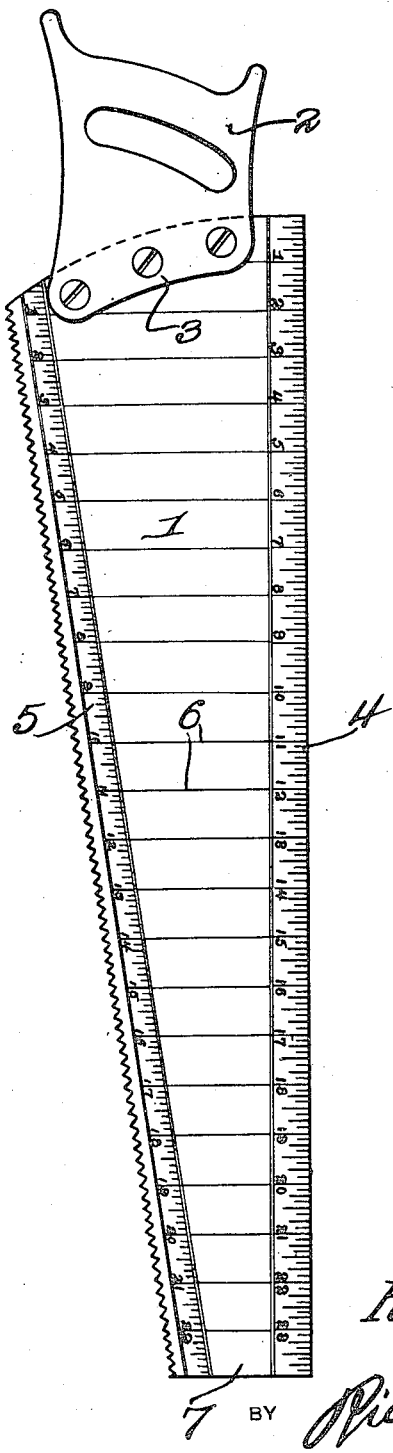
WITNESSES
INVENTOR
Richard A. Morrisey,
BY
ATTORNEY

UNITED STATES PATENT OFFICE.

RICHARD A. MORRISEY, OF PLYMOUTH, NORTH CAROLINA, ASSIGNOR OF ONE-HALF TO ZEBULON R. POWELL, OF PLYMOUTH, NORTH CAROLINA.

SAW.

1,281,810.  Specification of Letters Patent.  Patented Oct. 15, 1918.

Application filed August 1, 1917. Serial No. 183,941.

*To all whom it may concern:*

Be it known that I, RICHARD A. MORRISEY, a citizen of the United States, residing at Plymouth, in the county of Washington and State of North Carolina, have invented certain new and useful Improvements in Saws, of which the following is a specification.

This invention relates to saws and more particularly to a handsaw provided with measuring means formed integral with the saw blade.

One of the main objects of the invention is to provide a saw of the character stated of simple construction especially adapted for taking measurements and measuring the thicknesses of materials being sawed. A further object is to provide a saw the blade of which is so marked as to permit laying off a square or right-angle measurement, and to facilitate taking measurement of this character. Further objects will appear in the detailed description.

The single figure of the drawing is a side view of a saw constructed in accordance with my invention.

The saw is provided with a blade 1 which is secured in the handle 2 by means of the securing screws 3 in the usual manner. The upper or back edge of blade 1 is graduated as at 4 to indicate inches and fractions thereof. The cutting edge is similarly graduated as at 5. These graduations which are disposed in alinement transversely of the blade with the graduations of scale 4, while not truly inch marks, form units of measurement, which may be subdivided and used for laying off various measurements in the usual manner. Since the cutting edge of blade 1 is slanting, it will be evident that the units of scale 5 will be of greater length than the units of scale 4. By having the inclination of the cutting edge at a predetermined angle, the length of the units of scale 5 may be varied to have a predetermined relation to the divisions of scale 4. The inch marks of the series of graduations adjacent the back edge of the saw blade are extended substantially across the blade to within a short distance of the graduations of the scale 5 adjacent the other edge of the blade, these lines or marks 6 being disposed in parallelism with the outer end 7 of the blade.

The back edge of the saw blade is parallel with the axis of the blade, and the end of the blade remote from handle 2 is square or cut at a right angle to the back edge of the saw, as at 7. The marks 6 which extend the full width of the blade are also disposed at right angles to the back edge of the blade, or in parallelism with the squared end 7. By placing the back edge of the blade flush with the edge of a timber or board it can be readily ascertained if the end of the board is cut square. In a similar manner, a right or square angle can be easily laid off by utilizing the back edge and the square end of the blade, or by employing the back edge of the blade at any one of the marks 6. Also, by using the series of graduations 4, and the transverse marks 6, it is possible to quickly and easily lay off a square cut of any desired depth or to measure a cut which has already been laid off or sawed.

I am aware that it has been proposed to provide saw blades having one edge graduated for measuring purposes and having the end of the blade remote from the handle cut square. But, so far as I am aware, it has never been proposed to provide a saw having a blade constructed and marked in the peculiar manner set forth in my specification, whereby this blade is especially adapted for taking and laying off square measurements, this blade being further provided with a series of graduations adjacent its back edge, the principal markings of this series extending substantially the full width of the blade so as to facilitate the taking and laying off of square measurements, as well as the measuring of the thickness of the material being operated upon.

What I claim is:

A saw having a blade, the back edge of which is straight, the outer end of said blade being squared and disposed at a right angle to the back edge of the blade, said blade being provided with a scale adjacent the back edge, the unit marks of said scale being extended across the blade to within a short distance of the cutting edge thereof and forming unit marks for a scale adjacent said cutting edge.

In testimony whereof I affix my signature in presence of two witnesses.

RICHARD A. MORRISEY.

Witnesses:
F. W. Towe,
H. C. Towe.